United States Patent [19]

Sills et al.

[11] E Patent Number: Re. 33,322

[45] Reissued Date of Patent: Sep. 4, 1990

[54] DRIVE LINE SLIP JOINT ASSEMBLY

[75] Inventors: David Sills, Pueblo, Colo.; John Beckman, Toledo, Ohio

[73] Assignee: Dana Corporation, Toledo, Ohio

[21] Appl. No.: 119,759

[22] Filed: Nov. 12, 1987

Related U.S. Patent Documents

Reissue of:

[64] Patent No.: 4,552,544
Issued: Nov. 12, 1985
Appl. No.: 453,077
Filed: Dec. 27, 1982

[51] Int. Cl.[5] ..... F16C 3/03; F16D 3/06

[52] U.S. Cl. ..... 464/162; 403/359; 464/180; 464/181

[58] Field of Search ..... 74/490, 492; 403/359; 464/82, 83, 162, 180, 181; 206/522, 591, 594; 215/12 R; 264/127, 162

[56] References Cited

U.S. PATENT DOCUMENTS

| | | | |
|---|---|---|---|
| Re. 27,068 | 2/1971 | Groves et al. | 464/162 |
| 1,438,935 | 12/1922 | Denyes | 74/490 |
| 2,706,571 | 4/1955 | Ryan | 215/12 R |
| 3,016,722 | 1/1962 | Batdorf | 464/162 |
| 3,197,216 | 7/1965 | Jackson | 403/359 X |
| 3,318,170 | 5/1967 | Runkle | 74/493 |
| 3,369,425 | 2/1968 | Runkle et al. | 464/162 X |
| 3,383,882 | 5/1968 | Smirl | 464/162 |

*Primary Examiner*—Daniel P. Stodola
*Attorney, Agent, or Firm*—F. B. McDonald

[57] ABSTRACT

A drive line joint assembly (10) has splined driving and driven members (13,20), one of which has a protuberance (36) which extends axially along a spline (16,18) thereof to insure the absence of radial tolerance for balancing purpose. In a preferred form, a forged steel spline (16) has a resilient coating (40) bonded thereto, the coating preferably of a nylon or of other material having comparable low friction quality. The resilient protuberance is an integral part of the latter low friction coating and is formed by a broaching tool after the coating material has been applied to the spline. In a preferred embodiment, the proturberance extends only 0.001 to 0.003 inch above the surface of the coating, wherein the coating has a thickness in the range of 0.007 to 0.014 inch over the steel body portion of the spline. At least three of the protuberances are preferred, each circumferentially spaced from the other. The protuberances are utilized to take up all radial slack between driving and driven members of the drive line joint assembly, thereby allowing for no radial movement of one member with respect to the other.

6 Claims, 1 Drawing Sheet

DRIVE LINE SLIP JOINT ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to slip joint assemblies as utilized in drive lines. More particularly, the invention relates to an apparatus and method for reducing radial slack due to tolerances between rotary driving and driven splined members.

Many prior art devices have been employed to aid the reduction of slack between splined rotary members. For example, U.S. Pat. No. 3,318,170 discloses a system of balls, springs and collars for minimizing or reducing lateral movements between annular members. U.S. Pat. No. 1,438,935 discloses a system of spaced projections 22 which reduce radial movement between annular rotary members. U.S. Pat. No. 3,383,882, on the other hand, discloses a system of fingers in a pair of splined concentric members, wherein the fingers operate to radially secure an inner member 15 relative to an outer member 14.

Although each of these devices performs in a satisfactory manner, the devices are cumbersome and expensive to manufacture, and are not particularly suitable in those instances where one of the concentric splined driving and driven members is coated with a bonded low-friction material. In the latter circumstances, the manufacture of the afore-noted devices would involve special considerations to insure protection of the coatings.

SUMMARY OF THE INVENTION

The invention disclosed herein provides a system whereby the radial tolerances between driving and driven splined members may be absorbed without the use of complex apparatus or equipment and/or cumbersome manufacturing techniques. The apparatus and method herein disclosed are particularly suitable for situations wherein at least one of either the driving or driven members includes a low-friction coating bonded thereto.

In a preferred embodiment, the apparatus includes an axially extending resilient protuberance along at least three splines circumferentially spaced about one of the members. Each of the splines includes a coating of a material having a low-friction characteristic, and the protuberance extends in the range of 0.001 to 0.003 inch above the surface of the coating. The protuberance is preferably an integral part of the coating material. In a preferred method, the spline is coated with the low-friction material, and then broached to remove a thin layer of the material and to produce an axially extending protuberance over the faces of the three circumferentially spaced splines of one of the members.

DETAILED DESCRIPTION OF PREFERRED EMBODIMENTS

Figure 1:
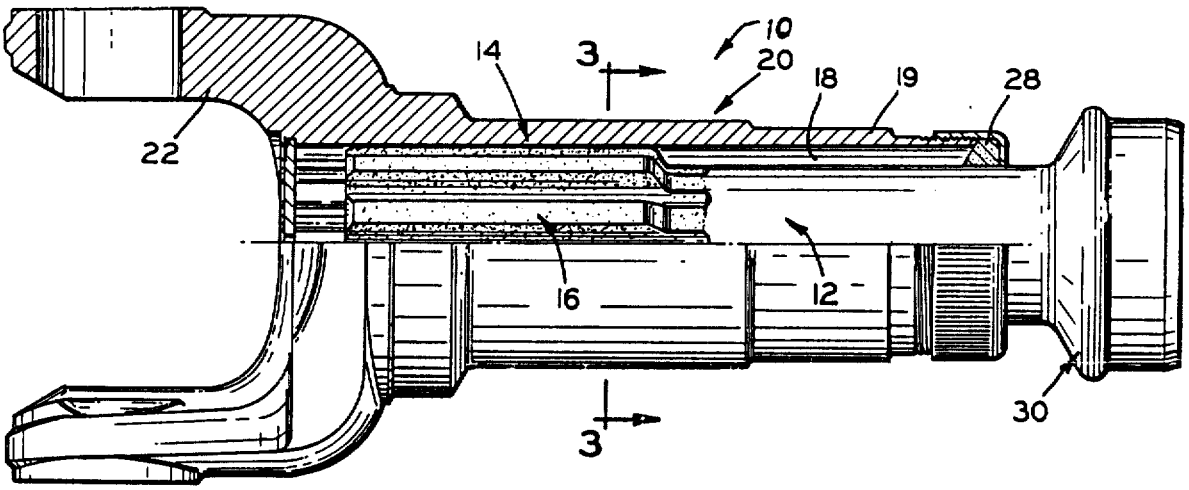
FIG. 1 is an axial view partly in cross section of a stub shaft and spline sleeve in driving relationship, wherein the stub shaft incorporates the present invention.
Figure 2:
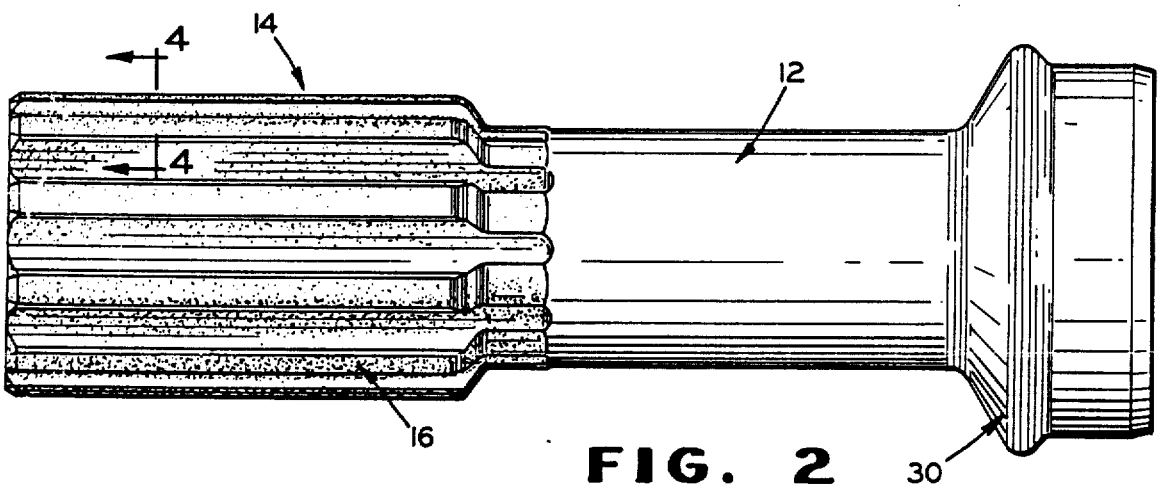
FIG. 2 is a view in elevation of the stub shaft of FIG. 1.

A drive line slip joint assembly 10 which incorporates the present invention is shown in FIG. 1. The slip joint assembly 10 includes a stub shaft or driving member 12 having a splined, enlarged portion 14 more clearly shown in FIG. 2. The enlarged portion 14 contains radially outwardly extending splines 16 which engage radially inwardly extending splines 18 of a mating sleeve 19 of a driven member 20. The driven member 20 in turn includes an integral yoke 22 for transmission of drive line torque.

Figure 4:
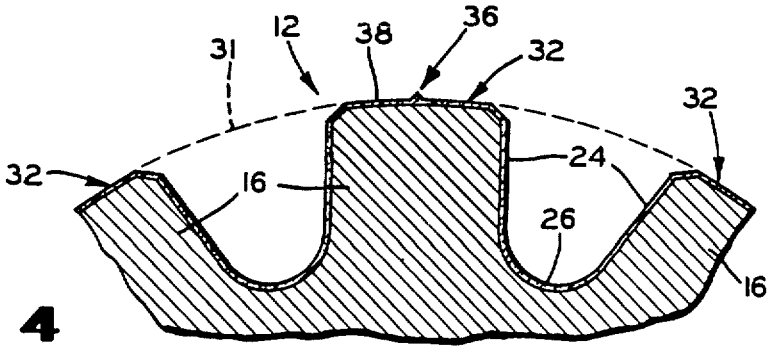
FIG. 4 is a fragmentary cross sectional view of one full spline of the stub shaft which incorporates the present invention, taken along lines 4—4 of FIG. 2.

Referring momentarily to FIG. 4, each outwardly extending spline 16 defines a pair of side walls 24, which inwardly terminate into a U-shaped bottom groove 26. The groove 26 provides means for receiving the mating splines 18 (FIG. 1) on the sleeve 19, and also provides for passage of lubricant. Conventional means are employed to manufacture the spline and groove shapes as discussed herein, typically by hobbing. A dirt seal 28 (FIG. 1) protects the rightward end of the assembly 10 against the intrusion of dirt or other contaminants, and also provides for prevention of lubricant escape. The rightward end of the stub shaft 12 further contains an integral extension 30 which is affixed to motive means (not shown).

Figure 3:
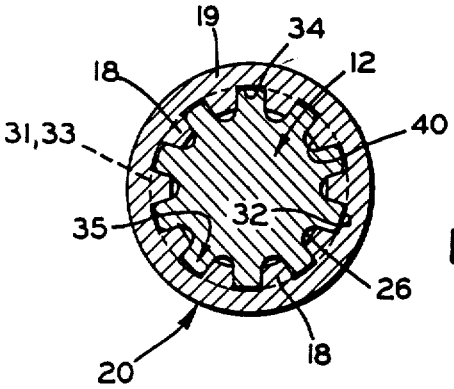
FIG. 3 is a view along lines 3—3 of FIG. 1.

Referring now to FIGS. 3 and 4, it will be seen that the radially outwardly extending walls 24 of the splines 16 terminate at relatively flat axially extending faces 32, which cooperate with but are spaced from corresponding flat faces 34 within the mating sleeve 19. It will be noted that the flat faces 32 of spline 16 are positioned at the terminal portions of the radially outwardly extending walls 24, while the flat faces 34 of the mating sleeve 19 are positioned between the individual splines 18 thereon. Thus, it will be appreciated that the flat faces 34 of the mating sleeve circumscribe an imaginary circle 33 which forms the outermost peripheral portion of a bore 35 through the driven member 20. Similarly, it will be seen and appreciated that the flat faces 32 of the mating splines 16 circumscribe an imaginary circle 31 which forms the outermost peripheral portion of the driving member or stub shaft 12. Concentric circles 31 and 33 are for convenience represented by a single dotted circle in FIG. 3. To the extent that there is a small amount of clearance between the mating driving and driven members (generally 1–2 thousandths of an inch), there will be a difference between the diameters of the respective circles; specifically, the outer circle 33 will be larger than the inner circle 31. The disparity in diameters, preferably in the range of 0.0015 to 0.0020 inch, will in fact create a potential balancing problem at particularly high speeds of operation. For example, a 250 ounce drive shaft which is free to move radially 0.0020 inch will generate an unbalance of potentially one-half inch-ounce. The unbalance becomes more critical as the speed of the drive shaft increases, due to the fact that balancing forces increase as a square of rotational speeds.

In the embodiment of FIGS. 3 and 4, the mating faces 32 and 34 are positioned at the outermost peripheral portions of the members 12 and 20, respectively, as described. Alternatively, the groove 26 could be adapted into a circumferentially extending face disposed for mating with the innermost peripheral face 40 of the splines 18 of the member 20 (FIG. 3). The latter situation is also within the scope of the present invention.

The invention as herein defined thus provides an axially extending, resilient protuberance 36 on a circumferentially spaced plurality of faces 32 on splines 16. (Alternatively the faces between the splines 18 may contain circumferentially spaced protuberances.) The protuberances are virtually microscopic in size, each having a radially extending dimension of only 0.001 to 0.003 inch. They resiliently operate to take up any radial slack or looseness (also referred to as "play") due to accumulation of tolerances between driving and driven members 12 and 20 for dynamic balancing purposes. The protuberances preferably are triangular in cross section, and have a dimension of approximately 0.009 to 0.012 inch at the base thereof, which forms is greatest dimension as well as its attachment to an individual spline. Each protuberance has a width less than the circumferential width of the face to which it is attached. In the preferred embodiment the face width is in the range of 0.040 to 0.125 inch.

In the preferred form of this invention, the protuberance 36 is a part of an applied coating 38, preferably one having a nylon base, as fully described in U.S. Pat. No. Re. 27,068. The latter coating comprises a hardened adhesively bonded low-friction material which provides for improved relative movement between splined driving and driven members. The preferred thickness of the nylon coating as applied over the preferably forged steel driving member 12 is constant to within less than one thousandth of an inch variation, and is in a preferred range of 0.007 to 0.012 inch.

A preferred method of making the protuberance includes the steps of adhesively applying the resilient nylon coating 38 to the splined portion of the member 12, and then removing a portion of the coating after application of the nylon to form the projection 36. A preferred method of removal is by a broaching operation wherein a single pass is made over the splined external portion of the member 12. For this purpose, particularly with use of hardened nylon material, a carbide ring is a preferred broaching apparatus.

Thus, for example, a commercially available nylon powder sold under the trademark "Corvel" NCA-77 nylon may be applied to a heat treated forged steel stub shaft 12 as described in U.S. Pat. No. Re. 27,068. However, instead of machining the coating to final tolerances as described therein by grinding, the outer peripheral faces or spline faces 32 are cut to final size in a single-pass broaching operation, wherein the cutting edges are notched. The cutting edges preferably have V-shaped notches, to leave a triangular shaped protuberance on at least three circumferentially spaced spline faces 32 about the splined portion 14 of the stub shaft driving member 12. A standard vertical broaching fixture may be employed, wherein the shaft 12 is held rigidly upright on centers (bored into the ends of the shaft), and wherein the broaching tool passes downwardly over the splines via hydraulic pressure actuation.

As mentioned, each protuberance 36 is preferably triangular in cross section, having its widest dimension at the base of the triangle, which forms its attachment to an individual spline. The triangular shape of the protuberance, and particularly the wide base thereof, maximizes lateral stability and strength and yet provides greatest resilience at the outer extremity of the protuberance where most needed. The preferred radially extending dimension (or height) of the triangle is 0.001 to 0.003 inch, the latter range in correspondence with the aforementioned disparity in diameters of inner and outer circles 31,33 (of 0.0015 to 0.0020 inch). It will be readily apparent to those skilled in the art that greater disparity in diameters will require greater dimensions of the protuberances for effective results. In any case, to the extent that the plurality of radially extending protuberances must resiliently, but positively, take up all slack between driving and driven members, the protuberances must extend physically a slight amount beyond the outer circle 33. Moreover, they must be elastically flexible for assuring a tight but resilient, slidable mating contact between driving and driven members for satisfactory operation.

What is claimed is:

1. A drive line slip joint component having a plurality of axially extending splines, each spline comprising an axially extending face, each face having a circumferentially extending width, at least two of said faces each comprising one resilient axially extending protuberance, each of said faces further comprising a low-friction coating bonded thereto, each resilient protuberance comprising an integral portion of said coating, said coating generally having a constant thickness over said face, said thickness within the range of 0.007 to 0.014 inch, and said protuberance extending 0.001 to 0.003 inch above the surface of said coating said protuberances being circumferentially spaced apart about said component, said protuberances providing means for enhancing the dynamic balancing of said component.

2. The slip joint component of claim 1 wherein said low-friction coating comprises a nylon base.

3. In a drive line slip joint assembly comprising a driving and a driven member, said driving member telescopically engaging a bore through one end of said driven member, said members respectively having intermeshing externally and internally splined portions forming a driving connection therebetween, said externally splined portion of said driving member defining a plurality of radially outwardly extending splines, each spline having a pair of side walls extending axially over said driving member, said splines having axially extending faces generally perpendicular to said side walls, said internally splined portion of said driven member defining a plurality of radially inwardly extending splines, each spline having a pair of side walls extending axially over said member each side wall of said driven member being disposed for cooperative contact with one of said side walls of said driving member, said splines of said driven member having axially extending faces wherein said faces of said driving member are spaced from said faces of said driven member; an improvement comprising at least two of said axially extending faces on one of said driving and driven members having an axially extending, resilient protuberance thereon, each of said faces further comprising a low-friction coating bonded thereto, each resilient protuberance comprising an integral portion of said coating, said coating generally having a constant thickness over said face, said thickness within the range of 0.007 to 0.014 inch, and said protuberance extending 0.001 to 0.003 inch above the surface of said coating said protuberances being circumferentially spaced apart about said one of said driving and driven members, said protuberances being elastically flexible for insuring slidable mating contact between driving and driven members, said protuberances providing means for enhancing the dynamic balancing of said assembly.

4. The slip joint assembly of claim 3, wherein said outermost peripheral portions of said bore of said driven member and said outermost peripheral portions of said driving member lie on concentric outer and inner circles respectively, the outer circle circumscribing the outermost peripheral portions of said bore and having a diameter in the range of 0.0015 to 0.0020 inch greater than that of said inner circle.

*5. A drive line slip joint component having a plurality of axially extending splines, each spline comprising an axially extending face, each face having a circumferentially extending width, at least two of said faces each comprising one resilient protuberance, each of said faces further comprising a low-friction coating bonded thereto, each resilient protuberance comprising an integral portion of said coating, said coating generally having a constant thickness over said face, said thickness within the range of 0.007 to 0.014 inch, and said protuberance extending 0.001 to 0.003 inch above the surface of said coating, said protuberances being circumferentially spaced apart about said component, said protuberances providing means for enhancing the dynamic balancing of said component.*

*6. The drive line component of claim 5 wherein at least two of said protuberances are parallel with respect to one another.*

* * * * *